UNITED STATES PATENT OFFICE.

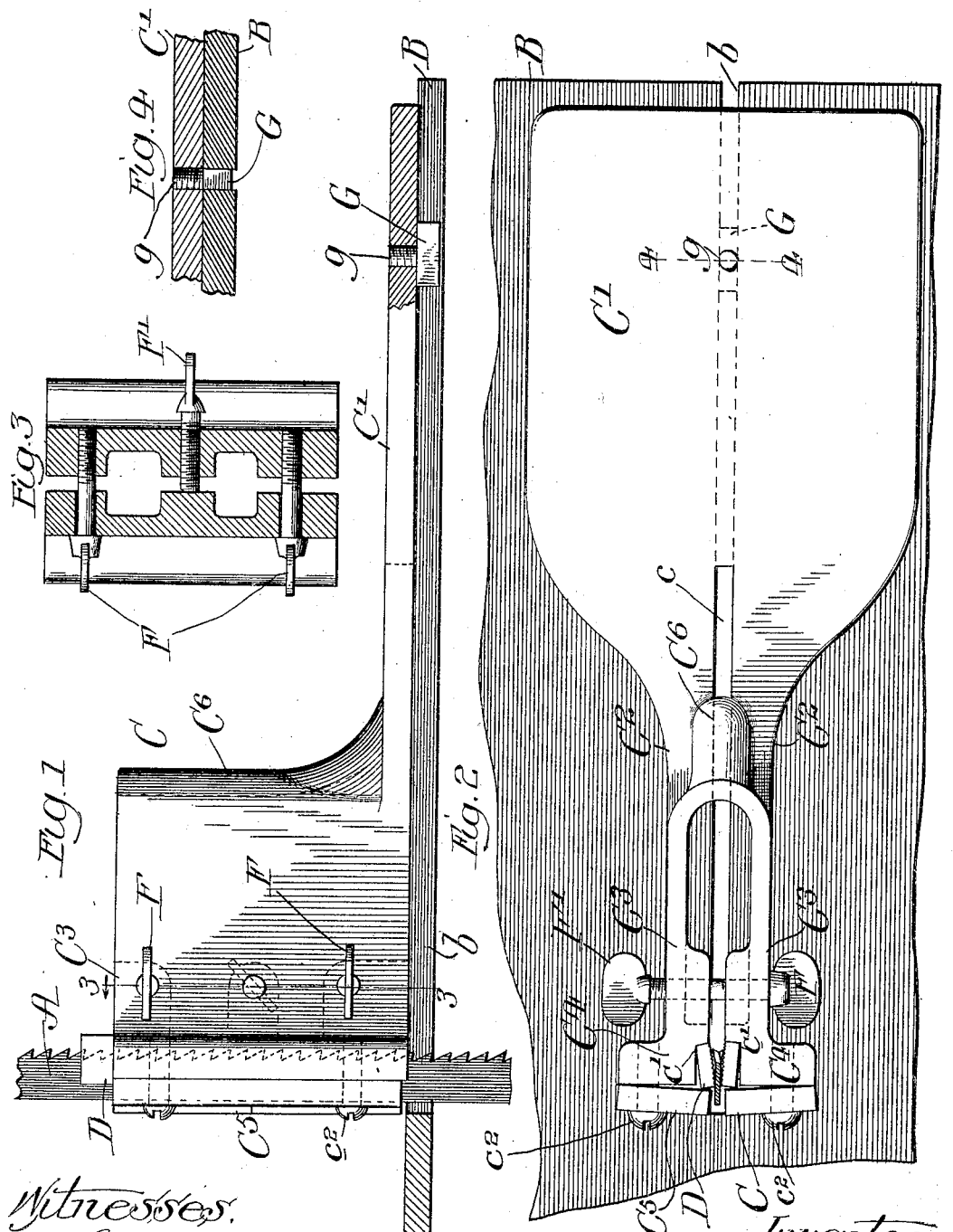

HANS JOHANSEN, OF CHICAGO, ILLINOIS.

DEVICE FOR DRESSING BAND-SAWS.

No. 821,293.            Specification of Letters Patent.            Patented May 22, 1906.

Application filed May 20, 1905. Serial No. 261,298.

*To all whom it may concern:*

Be it known that I, HANS JOHANSEN, a citizen of the United States, residing at Chicago, in the county of Cook and State of Illinois, have invented certain new and useful Improvements in Devices for Dressing Band-Saws; and I do hereby declare that the following is a full, clear, and exact description thereof, reference being had to the accompanying drawings, and to the letters of reference marked thereon, which form a part of this specification.

This invention relates to a novel implement for side-dressing band-saws subsequent to the filing of the same for the purpose of smoothing the outer faces of the saw-teeth, and thereby produce a clean-cutting saw.

Among the objects of the invention is to produce a simple, effective, and economically-constructed device of the character described and one which may be employed for dressing a band-saw while in its usual operative position in the sawing-machine.

The invention consists in the matters hereinafter set forth, and more particularly pointed out in the appended claims.

In the drawings, Figure 1 is a side elevation, with parts broken away, of a saw-dressing implement made in accordance with my invention, showing the same as adapted to dress a band-saw. Fig. 2 is a top plan view of the parts shown in Fig. 1. Fig. 3 is a vertical section taken on line 3 3 of Fig. 1. Fig. 4 is a transverse vertical section taken on line 4 4 of Fig. 2.

As shown in the drawings, A indicates a band-saw, and B a saw-table having the usual slot $b$, through which the saw passes and upon which table the work is supported while being sawed.

C designates as a whole my improved saw-dressing implement. It consists of a base or supporting plate C', which, as herein shown, is made flat and fits upon the top of the saw-table. Said base-plate is provided at its forward or inner end with spring-arms $C^2$ $C^2$ (formed by providing the narrow inner end thereof with a slot $c$) and with parallel relatively thin holding-jaws $C^3$ $C^3$, rising upwardly from and made integral with said arms and of considerable width from front to the rear thereof. Said jaws are separated at their upper ends and are also separated at their forward or advance margins to permit the saw A to enter between the same. Said forward margins of the jaws are provided with laterally-extending flanges $C^4$ $C^4$. The adjacent faces of said flanged margins of the jaws are provided with vertical notches or seats $c'$ $c'$, which are constructed to receive bars D D, having their inner faces formed to constitute file or abrading faces. The said bars D are held in place in said seats $c'$ by means of vertical clamping-bars $C^5$ $C^5$, fixed to the flanges $C^4$ by clamping-screws $c^2$ and bearing against the outer or front margins of said abrading-bars or files. The parts are so constructed that the abrading or file surfaces of the bars D diverge rearwardly, and thereby adjust said surfaces to the set of the saw-teeth. When the file or abrading-bars are made rectangular in cross-section, this result is accomplished by inclining the seats $c'$ rearwardly and away from each other.

Means are provided for adjusting the jaws toward and from each other, thus permitting the files or abrading-bars to be adjusted to a greater or less distance apart to correspond with the varying thicknesses of the saws to be dressed thereby. The means herein shown for effecting this result consists of three screws F, F, and F', located in rear of the file-seats, two of which, F F, extend loosely through one of the jaws at the upper and lower margins thereof and have screw-threaded engagement with the other jaw, and the third screw F' of which is located between the upper and lower screws and has screw-threaded engagement with the jaw through which it extends and bears at its inner end against the other jaw. This construction is more clearly shown in Fig. 3. With this construction the screws F F' serve not only to adjust the jaws toward and away from each other, but serve also to lock the jaws in an adjusted position. By reason of the arrangement of the screws it will be observed also that the parallelism of the jaws may be accurately maintained, thereby insuring a proper cutting contact of the files or abrading-bars with the saw throughout the length of the files or bars. It is desirable that the upper and lower margins of said spring-jaws $C^3$ shall be adjusted toward and away from each other with practically the same screw-power in order that such parallelism may be reliably maintained. By reason of the integrality of the lower margins of the holding-jaws $C^3$ with the spring-arms $C^2$ there is a tendency to greater rigidity at the lower than the upper separated margins of the jaws. In order to practically equalize the tension of the spring holding-jaws, at the upper and lower sides of said jaws I have shown the rear margins of said vertical spring holding-jaws as connected together by a curved web $C^6$, which is integral not only with the jaws, but with the spring-arms $C^2$. Such web tends to stiffen the upper parts of the jaws, and therefore practically equalizes the spring of the jaws at the upper and lower side margins thereof. The said jaws $C^3$ are made of such width from front to rear thereof as to give proper resiliency thereto without the necessity of making the jaws unduly light.

The implement is applied to the saw-table temporarily when the saw is to be dressed, and it is desirable that the means of application shall be such that the device may be readily applied while holding the same reliably in proper relation or alinement with the saw. For this purpose I have shown the base as provided with a downwardly-projecting lug G, which fits within the slot $b$ in the saw-table. Said lug G consists in this instance of the head of a screw $g$ and extends upwardly through the base-plate, but may obviously be otherwise formed. The implement is alined and held from lateral movement by the lug G and is otherwise held in place on the table while the saw is being dressed by the hand of the person dressing the saw. The dressing device may be held in place by one hand and the saw passed between the files thereof by turning with the other hand the wheel over which the saw is trained. It will be observed that the flat base C' holds the device squared on the saw-table relatively to the saw and that such stability of the device when in place is assisted by reason of the engagement with the saw-table of the laterally-projecting flanges $C^4$ at the advance end of the device. The base may, however, be varied in its contour and construction so long as is retained this feature which contributes stability to the device when in place.

I have herein shown a practical embodiment of my invention; but it is to be understood that the details thereof may be varied within the scope of the invention, and I do not limit myself, therefore, to such details except as made the subject of specific claims.

I claim as my invention—

1. A device for dressing band-saws comprising a flat horizontal base adapted to rest upon the upper face of the saw-table, clamping-jaws extending forwardly therefrom and rising above the level of the base, said jaws being made integral with the base, and with each other at their rear margins, and provided near the forward margins of their proximate faces with vertical seats to receive abrading-bars, and means for adjusting the jaws toward each other.

2. A device for dressing saws comprising a horizontal base formed at one end to constitute integral spring-arms, parallel holding-jaws rising from said spring-arms and provided on their inner faces at their forward margins with opposing vertical seats to receive abrading-bars or files, and means for adjusting said jaws toward and from each other.

3. A saw-dressing device comprising a horizontal base formed at one end to constitute spring-arms, parallel holding-jaws rising from and made integral with said spring-arms, said jaws being separated at their advanced margins to receive a saw, and provided in the proximate faces of their advance margins with vertical seats to receive abrading-bars or files, and means for adjusting said jaws toward and from each other, said jaws being connected at their rear margins by an integral web.

4. A device for dressing saws comprising parallel holding-jaws which are separated at their advance margins to receive a saw and provided on the inner faces of their advance margins with seats to receive abrading-bars or files, and means for adjusting the jaws toward and from each other comprising two screws extending loosely through one of the jaws and having screw-threaded engagement with the other jaw, and a third screw located between the other screws having screw-threaded engagement with the jaw through which the other screws loosely extend and bearing at its inner end against the other jaw.

In testimony that I claim the foregoing as my invention I affix my signature, in presence of two witnesses, this 4th day of February, A. D. 1905.

HANS JOHANSEN.

Witnesses:
E. R. WILKINS,
W. L. HALL